US012602289B1

(12) United States Patent
Lamichhane et al.

(10) Patent No.: US 12,602,289 B1
(45) Date of Patent: Apr. 14, 2026

(54) SYSTEMS AND METHODS FOR PREVENTING GRAY FAILURES IN CLOUD APPLICATIONS

(71) Applicant: JPMORGAN CHASE BANK, N.A., New York, NY (US)

(72) Inventors: Ashish Lamichhane, Glen Mills, PA (US); Kiran Sekharamahanthi, Newark, DE (US); Allie Pistolessi, Newark, DE (US); Robert Huarcaya Lazaro, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/950,541

(22) Filed: Nov. 18, 2024

(51) Int. Cl.
 *G06F 11/14* (2006.01)
(52) U.S. Cl.
 CPC .................................. *G06F 11/142* (2013.01)
(58) Field of Classification Search
 CPC ............... G06F 11/0793; G06F 11/142; G06F 11/1425; G06F 11/1428; G06F 11/143; G06F 11/1433; G06F 11/20; G06F 11/202; G06F 8/60; G06F 8/65; G06F 8/656
 See application file for complete search history.

(56) References Cited

U.S. PATENT DOCUMENTS

| | | | | |
|---|---|---|---|---|
| 9,262,152 | B1 * | 2/2016 | Kurian | .................... H04L 67/10 |
| 2014/0096125 | A1 * | 4/2014 | Kimmet | .................... G06F 8/61 |
| | | | | 717/172 |
| 2016/0026453 | A1 * | 1/2016 | Zhang | ........................ G06F 8/65 |
| | | | | 717/171 |
| 2018/0248750 | A1 * | 8/2018 | Johnston | .................... G06F 8/65 |
| 2023/0359520 | A1 * | 11/2023 | Edamadaka | ........ G06F 11/0709 |
| 2024/0048449 | A1 * | 2/2024 | Kwapniewski | ....... H04W 48/18 |

* cited by examiner

*Primary Examiner* — Gabriel Chu
(74) *Attorney, Agent, or Firm* — GREENBERG TRAURIG LLP

(57) ABSTRACT

A method may include: a listener application receiving a health status of cloud applications in cloud pools, each cloud pool hosted by cloud hardware; the listener application receiving a maintenance schedule comprising a plurality of maintenance events for the cloud application and/or the cloud hardware, the maintenance schedule; the listener application identifying an impacted cloud application and/or cloud hardware that is scheduled for one of the maintenance events; the listener application mapping the impacted cloud hardware and/or cloud applications to a global load balancer; a remediation application sending a first command to the mapped global load balancer to disable traffic to the impacted cloud hardware and/or cloud applications; the remediation application executing the maintenance events on the cloud hardware and/or cloud applications; the remediation application sending a second command to the global mapped global load balancer to re-enable traffic to the impacted cloud hardware and/or cloud applications.

20 Claims, 4 Drawing Sheets

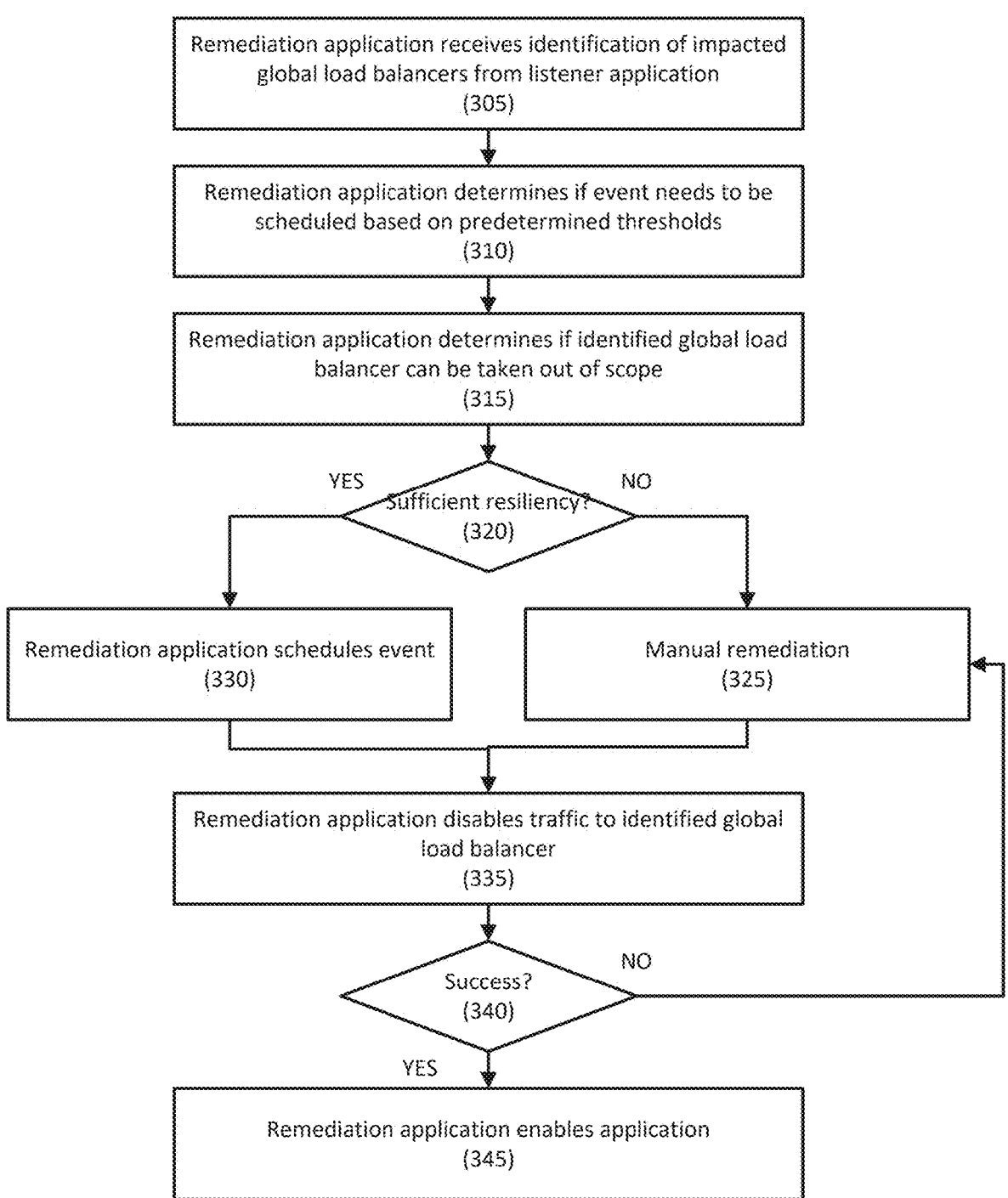

Remediation application receives identification of impacted global load balancers from listener application
(305)

Remediation application determines if event needs to be scheduled based on predetermined thresholds
(310)

Remediation application determines if identified global load balancer can be taken out of scope
(315)

YES          Sufficient resiliency?          NO
(320)

Remediation application schedules event
(330)

Manual remediation
(325)

Remediation application disables traffic to identified global load balancer
(335)

Success?          NO
(340)

YES

Remediation application enables application
(345)

FIGURE 3

SYSTEMS AND METHODS FOR PREVENTING GRAY FAILURES IN CLOUD APPLICATIONS

BACKGROUND OF THE INVENTION

1. Field of the Invention

Embodiments relate to systems and methods for preventing gray failures in cloud applications.

2. Description of the Related Art

Many application platforms include a component that provides health checks of applications and hardware. These components often require consecutive health check failures before marking the application or hardware as unhealthy and diverting traffic away from the application or hardware. Even a few seconds delay, however, can cause significant disruption for mission critical applications. This may lead to a substantial negative impact on the user experience and customer satisfaction, as thousands of customers may be unable to access their data.

SUMMARY OF THE INVENTION

Systems and methods for preventing gray failures in cloud applications are disclosed. In one embodiment, a method may include: receiving, by a listener application and from a health monitoring application for a plurality of cloud pools, a health status of a plurality of cloud applications in the plurality of cloud pools, each cloud pool hosted by cloud hardware; receiving, by the listener application, a maintenance schedule for the cloud application and/or the cloud hardware, the maintenance schedule comprising a plurality of maintenance events; identifying, by the listener application, an impacted cloud application and/or cloud hardware that is scheduled for one of the maintenance events from the maintenance schedule; mapping, by the listener application, the impacted cloud hardware and/or cloud applications to a global load balancer; sending, by a remediation application, a first command to the mapped global load balancer to disable traffic to the impacted cloud hardware and/or cloud applications; executing, by the remediation application, the maintenance events on the cloud hardware and/or cloud applications; and sending, by the remediation application, a second command to the global mapped global load balancer to re-enable traffic to the impacted cloud hardware and/or cloud applications.

In one embodiment, each of the plurality of cloud pools may include an instance of each cloud application.

In one embodiment, the method may also include receiving, by the listener application, critical resource utilization and terminate signals from the plurality of cloud pools.

In one embodiment, the health monitoring application periodically polls the cloud hardware and/or the cloud applications for a health status.

In one embodiment, the maintenance events comprise patches.

In one embodiment, the method may also include determining, by the remediation application, that the impacted cloud hardware and/or cloud applications can be taken out of scope before sending the first command.

In one embodiment, the determination may be based on a degradation in service resulting from the impacted cloud hardware and/or cloud applications being taken out of scope.

In one embodiment, the method may also include retrieving, by the listener application, a prior status of the cloud hardware and/or cloud applications; and determining, by the listener application, that the cloud hardware and/or cloud applications were previously healthy before identifying the impacted cloud application and/or cloud hardware.

In one embodiment, the remediation application waits a period of time before sending the second command.

According to another embodiment, a system may include: a plurality of cloud pools, each cloud pool hosted by cloud hardware; a plurality of cloud applications in each of the cloud pools; a health monitoring application for the plurality of cloud applications in each of the cloud pools; a plurality of global load balancers, each load balancer in communication with a subset of the plurality of cloud pools; a listener application; and a remediation application. The listener application is configured to receive, from each health monitoring application, a health status of the plurality of cloud applications in the plurality of cloud pools; the listener application is configured to receive a maintenance schedule for the cloud application and/or the cloud hardware, the maintenance schedule comprising a plurality of maintenance events; the listener application is configured to identify an impacted cloud application and/or cloud hardware that is scheduled for one of the maintenance events from the maintenance schedule; the listener application is configured to map the impacted cloud hardware and/or cloud applications to one of the global load balancers; the remediation application is configured to send a first command to the mapped global load balancer to disable traffic to the impacted cloud hardware and/or cloud applications; the mapped global load balancer is configured to disable traffic to the impacted cloud hardware and/or cloud applications; the remediation application is configured to execute the maintenance events on the cloud hardware and/or cloud applications; the remediation application is configured to send a second command to the global load balancer to re-enable traffic to the impacted cloud hardware and/or cloud applications; and the mapped global load balancer is configured to enable traffic to the impacted cloud hardware and/or cloud applications.

In one embodiment, each of the plurality of cloud pools may include an instance of each cloud application.

In one embodiment, the listener application may be configured to receive critical resource utilization and terminate signals from the plurality of cloud pools.

In one embodiment, the health monitoring application periodically polls the cloud hardware and/or the cloud applications for a health status.

In one embodiment, the maintenance events comprise patches.

In one embodiment, the remediation application may be configured to determine that the impacted cloud hardware and/or cloud applications can be taken out of scope before sending the first command, wherein the determination may be based on a degradation in service resulting from the impacted cloud hardware and/or cloud applications being taken out of scope.

In one embodiment, the listener application may be configured to receive a prior status of the cloud hardware and/or cloud applications; and the listener application may be configured to determine that the cloud hardware and/or cloud applications were previously healthy before identifying the impacted cloud application and/or cloud hardware.

In one embodiment, the remediation application waits a period of time before sending the second command.

According to another embodiment, a non-transitory computer readable storage medium may include instructions stored thereon, which when read and executed by one or more computer processors, cause the one or more computer processors to perform steps comprising: receiving, from a health monitoring application for a plurality of cloud pools, a health status of a plurality of cloud applications in the plurality of cloud pools, each cloud pool hosted by cloud hardware, wherein each of the plurality of cloud pools comprises an instance of each cloud application; receiving a maintenance schedule for the cloud application and/or the cloud hardware, the maintenance schedule comprising a plurality of maintenance events; identifying an impacted cloud application and/or cloud hardware that is scheduled for one of the maintenance events from the maintenance schedule; mapping the impacted cloud hardware and/or cloud applications to a global load balancer; sending a first command to the mapped global load balancer to disable traffic to the impacted cloud hardware and/or cloud applications; executing the maintenance events on the cloud hardware and/or cloud applications; and sending a second command to the mapped global load balancer to re-enable traffic to the impacted cloud hardware and/or cloud applications.

In one embodiment, the non-transitory computer readable storage medium may also include instructions stored thereon, which when read and executed by the one or more computer processors, cause the one or more computer processors to perform steps comprising: determining that the impacted cloud hardware and/or cloud applications can be taken out of scope before sending the first command, wherein the determination is based on a degradation in service resulting from the impacted cloud hardware and/or cloud applications being taken out of scope.

In one embodiment, the non-transitory computer readable storage medium may also include instructions stored thereon, which when read and executed by the one or more computer processors, cause the one or more computer processors to perform steps comprising: retrieving a prior status of the cloud hardware and/or cloud applications; and determining that the cloud hardware and/or cloud applications were previously healthy before identifying the impacted cloud application and/or cloud hardware.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts a method for application remediation according to an embodiment.

DETAILED DESCRIPTION OF PREFERRED EMBODIMENTS

Embodiments relate to systems and methods for preventing gray failures in cloud applications.

Embodiments automatically detect maintenance and restart activities by monitoring logs, alerts, and schedules.

Embodiments may provide continuous health monitoring by using a health check mechanism that polls application health endpoints. The health checks may verify each application's responsiveness. Any kind of patching or repaving will send a signal to applications. A listener will read this signal and may immediately route data away from the impacted pool/container/virtual-machines if predetermined application criteria is met.

Upon detecting a scheduled maintenance activity or restart, embodiments may automatically disable the affected applications and/or hardware, which prevents traffic from being directed to instances that are undergoing maintenance or restarting.

Health checks may be performed even when the applications and/or hardware are disabled. If the application responds successfully and consistently for a specified duration, the applications and/or hardware may be re-enabled. This ensures that only fully functional instances handle the traffic, enhancing reliability and performance.

Embodiments may use automated decision-making algorithms to determine when to disable and re-enable applications and/or hardware. The algorithms may consider various factors, including the frequency and stability of successful health check responses.

By intelligently managing applications and/or hardware, embodiments may eliminate disruptions to an application's availability. Users may then experience seamless performances, even during the maintenance periods.

Figure 1:
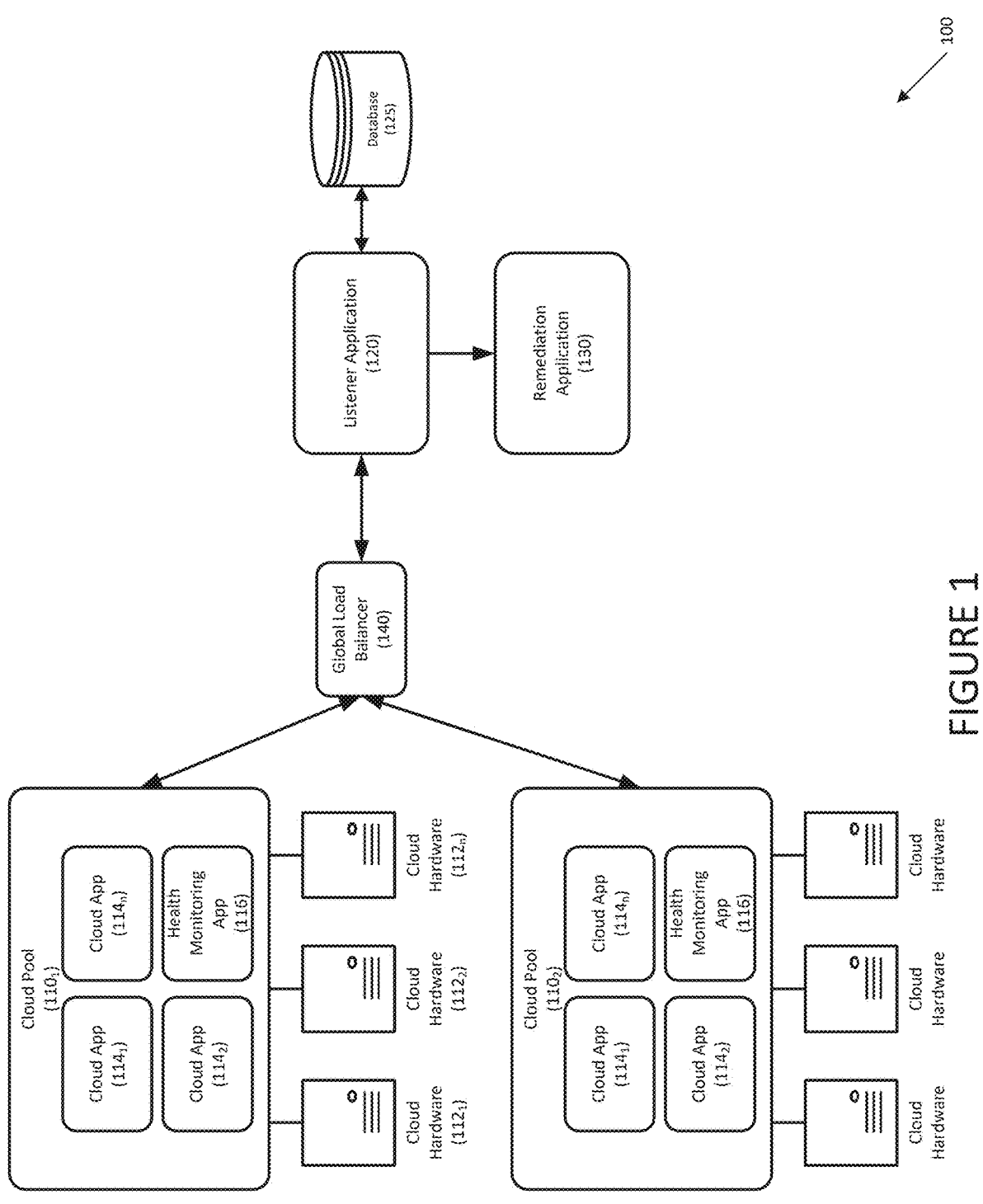
FIG. 1 illustrates a system for preventing gray failures in cloud applications according to an embodiment.

Referring to FIG. 1, a system for preventing gray failures in cloud applications is disclosed according to an embodiment. System 100 may include one or more cloud pools 110 (e.g., cloud pool 110$_1$, cloud pool 110$_2$), which may include cloud apps 114 (e.g., cloud app 114$_1$, cloud app 114$_2$, . . . cloud app 114$_n$). Cloud pools 110 may be hosted by cloud hardware 112 (e.g., cloud hardware 112$_1$, cloud hardware 112$_2$, . . . cloud hardware 112$_n$), which may include servers and other electronic devices.

Cloud apps 114 may be hosted in multiple cloud pools 110, and each cloud pool 110 may have multiple instances of one of cloud apps 114.

Cloud pools 110 may be provided with global load balancer 140, which may route incoming traffic to one of the plurality of cloud apps 114. Global load balancer 140 routes traffic across cloud pools 110. If one of cloud pools 110 or cloud app 114 is impacted, global load balancer may route traffic away from the impacted cloud pool 110 or cloud app 114 and to a healthy cloud pool 110 and cloud app 114.

Cloud pool 110 may further include health monitoring app 116, which may monitor and provide the health status of cloud hardware 112 and/or cloud apps 114. Health monitoring app 116 may periodically poll cloud hardware 112 and/or cloud apps 114, and may determine the health status of each cloud hardware 112 and cloud app 114 based on the response.

System 100 may further include listener application 120 and remediation application 130, which may be computer programs. Listener application 120 may be hosted in one of the cloud pools 110, or in a different infrastructure. In one embodiment, listener application 120 and remediation application 130 may be hosted by different infrastructure than cloud pools 110 for stability. Listener application 120 may monitor the health of cloud hardware 112 and cloud apps 114, and remediation application 130 may take one or more actions in response to a health issue with cloud hardware 112 and/or cloud apps 114.

Listener application 120 may receive the health status from health monitoring apps 116, and may receive patching schedules from cloud provider APIs, resource utilization signals are generated from OS kernels of cloud pools 110, from cloud hardware 112, etc. Response time signals for cloud applications 114 may be received from monitoring tools and may be provided to one of the health monitoring apps 116.

Remediation application 130 may determine an impact of a health issue on, for example, global load balancers 140 and may employ automated decision making algorithms to take any necessary remediation actions. Examples of remediation actions may include routing traffic away from the affected cloud pools 110, cloud hardware 112 and/or cloud apps 114.

Database 125 may maintain information on cloud hardware 112 and cloud apps 114 as well as maintenance schedules (e.g., patching schedules). Database 125 may store past and current health statuses for cloud hardware 112 and/or cloud apps 114.

Figure 2:
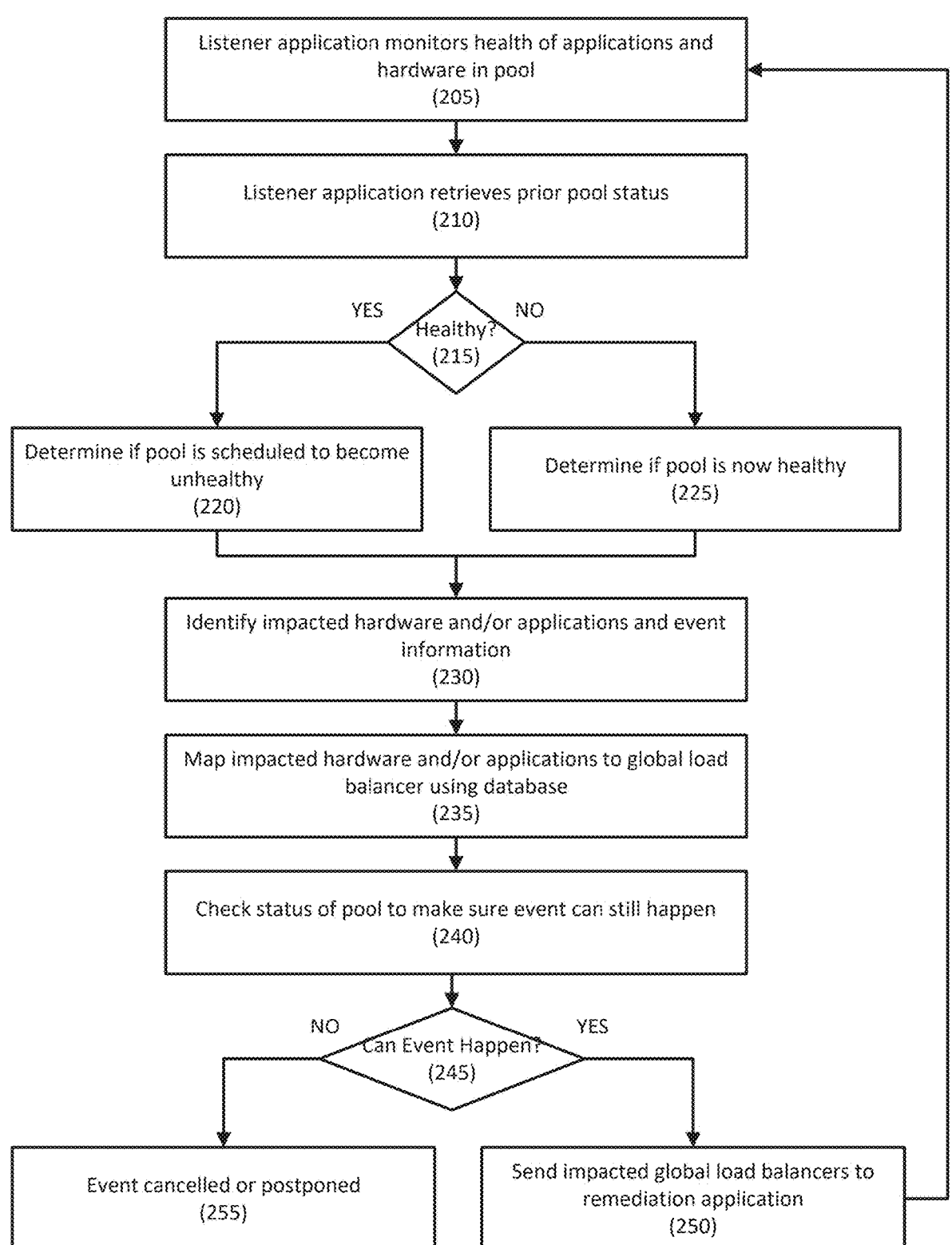
FIG. 2 depicts a method for identifying gray failures according to an embodiment.

Referring to FIG. 2, a method for identifying gray failures in cloud applications is disclosed according to an embodiment.

In step 205, a listener application may monitor the health of hardware and/or applications in a pool, such as a cloud pool. In one embodiment, the health of the hardware and/or applications may be received via a health monitoring application provided in the cloud pool. The listener application may further receive maintenance schedules from a database, and critical resource utilization and terminate signals from one or more health monitoring applications in the cloud pool.

For example, the listener application may receive information from multiple data sources, such as patching schedules from cloud provider APIs, resource utilization signals from OS kernels of the cloud pools, monitoring tools, health status from health monitoring applications, etc.

In step 210, the listener application may retrieve a prior status for the cloud pool, such as the status of the cloud hardware and/or cloud applications. The prior status may indicate whether the hardware and/or applications were previously healthy or unhealthy.

The health status may be retrieved from a database.

If, in step 215, the prior status was healthy, in step 220 the listener application may determine if any of the hardware and/or applications are scheduled to become unhealthy, such as due to a scheduled maintenance event. If the prior status was unhealthy, in step 225, the listener application may determine if the unhealthy hardware and/or applications are healthy based on application-level health checks that may be provided by a health monitoring application.

In step 230, the listener application may identify any impacted hardware and/or applications by the scheduled maintenance event (and healthy application to which traffic may be routed), and the event information associated with an event that makes the hardware and/or applications unhealthy. Examples of events may include high latency, high critical resource utilization, terminate signals, etc.

In step 235, the listener application may map the impacted hardware and/or applications to a global load balancer using a database. For example, the listener application may access a mapping to determine which global load balancer is associated with the impacted cloud application or cloud hardware.

In step 240, the listener application may check the pool status to determine if the scheduled event can happen. For example, the listener application may retrieve a schedule of pre-scheduled events from a cloud provider service. If, in step 245, the scheduled event can happen, in step 250, the listener application may send information for the impacted global load balancers to a remediation application. For example, the listener application may send details of the event, including the IP address of other identifier for the impacted cloud pool, cloud application, and/or cloud hardware.

If the scheduled event cannot happen, such as a schedule change, in step 255, the event may be cancelled or postponed.

Referring to FIG. 3, a method for application remediation is disclosed according to an embodiment.

In step 305, a remediation application may receive an identification of impacted global load balancers from the listener application. It may also receive event information for an event, including patching schedules, terminate signals, critical resource utilizations, health checks, etc.

In step 310, the remediation application may determine if the event needs to be scheduled based on a predetermined threshold. For example, the predetermined threshold may be based on configurations from the application owner, a tolerance for application downtime, and a deterioration in service level that results from the application downtime. In one embodiment, the threshold may be determined using a trained machine learning engine, using historical information. In another embodiment, the threshold may be dynamic and updated during runtime.

In step 315, the remediation application may determine if the impacted hardware and/or applications can be taken out of scope. This determination may be based on, for example, the resiliency of the pool, such as other applications that can process incoming traffic, sufficient application memory allocation, minimum numbers of pools required, etc.

For example, a minimum number of pools required for optimal performance may be pre-configured, and based on these pre-configured values, the remediation application may determine when it can take action.

If, in step 320, there is not sufficient resiliency, in step 325, manual remediation may be performed. This may include, for example, sending communications (e.g., emails, alerts, incident creations) to the corresponding application team for further triage.

If there is sufficient resilience, in step 330, the remediation application may schedule the event. This may be based, for example, on whether the event is a planned outage/maintenance, or an unplanned outage. If the event is a planned outage/maintenance, the remediation application may schedule the event to occur before a planned timeframe, such as a timeframe set by the cloud provider. If the event is an unplanned outage, the remediation application may schedule the event to occur immediately.

In step 335, at the scheduled time, using the identified global load balancer, the remediation application may disable traffic to the impacted hardware and/or applications, and the event may be executed. For example, the remediation application may issue a command to the associated global load balancer to disable traffic to the impacted hardware and/or applications.

In step 340, if the event was successful (e.g., a successful response for the executed command is received from the cloud provider), in step 345, the remediation application may enable the application. For example, the remediation application may issue a command to the associated global load balancer to re-enable traffic to the impacted hardware and/or applications. In one embodiment, the remediation application may wait a period of time (e.g., 24 hours) before enabling the application.

During this period, additional validations, such as checking that the scheduled event is complete, may be performed.

In the event it is unsuccessful, manual remediation may be performed in step 325. For example, communications, such as emails, alerts, incident creation, etc. may be sent to the corresponding application team for further triage.

Figure 4:
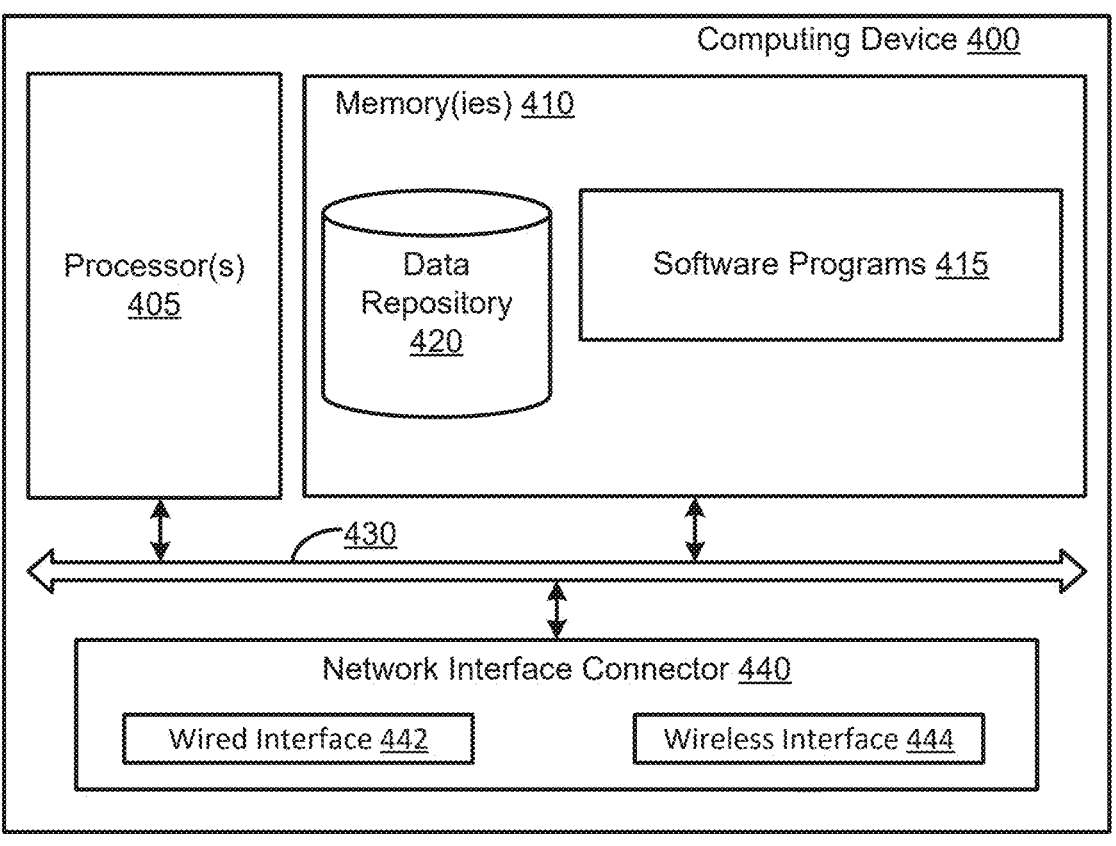
FIG. 4 depicts an exemplary computing system for implementing aspects of the present disclosure.

FIG. 4 depicts an exemplary computing system for implementing aspects of the present disclosure. FIG. 4 depicts exemplary computing device 400. Computing device 400 may represent the system components described herein. Computing device 400 may include processor 405 that may be coupled to memory 410. Memory 410 may include volatile memory. Processor 405 may execute computer-executable program code stored in memory 410, such as software programs 415. Software programs 415 may include one or more of the logical steps disclosed herein as a programmatic instruction, which may be executed by processor 405. Memory 410 may also include data repository 420, which may be nonvolatile memory for data persistence. Processor 405 and memory 410 may be coupled by bus 430. Bus 430 may also be coupled to one or more network interface connectors 440, such as wired network interface 442 or wireless network interface 444. Computing device 400 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a listener application and from a health monitoring application for a plurality of cloud pools, a health status of a plurality of cloud applications in the plurality of cloud pools, each cloud pool hosted by cloud hardware;

receiving, by the listener application, a maintenance schedule for the plurality of cloud applications and/or the cloud hardware, the maintenance schedule comprising a plurality of maintenance events;

identifying, by the listener application, an impacted cloud application of the plurality of cloud applications and/or impacted cloud hardware that is scheduled for one of the plurality of maintenance events from the maintenance schedule;

mapping, by the listener application, the impacted cloud hardware and/or the impacted cloud application to a global load balancer;

sending, by a remediation application, a first command to the mapped global load balancer to disable traffic to the impacted cloud hardware and/or the impacted cloud application;

executing, by the remediation application, the maintenance events on the impacted cloud hardware and/or the impacted cloud application; and sending, by the remediation application, a second command to the mapped global load balancer to re-enable traffic to the impacted cloud hardware and/or the impacted cloud application.

2. The method of claim 1, wherein each of the plurality of cloud pools comprises an instance of each cloud application.

3. The method of claim 1, further comprising:

receiving, by the listener application, critical resource utilization and terminate signals from the plurality of cloud pools.

4. The method of claim 1, wherein the health monitoring application periodically polls the cloud hardware and/or the plurality of cloud applications for a health status.

5. The method of claim 1, wherein the maintenance events comprise patches.

6. The method of claim 1, further comprising:

determining, by the remediation application, that the impacted cloud hardware and/or the impacted cloud application can be taken out of scope before sending the first command.

7. The method of claim 6, wherein the determination is based on a degradation in service resulting from the impacted cloud hardware and/or the impacted cloud application being taken out of scope.

8. The method of claim 1, further comprising:

retrieving, by the listener application, a prior status of the cloud hardware and/or the plurality of cloud applications; and determining, by the listener application, that the impacted cloud hardware and/or the impacted cloud application were previously healthy before identifying the impacted cloud application and/or the impacted cloud hardware.

9. The method of claim 1, wherein the remediation application waits a period of time before sending the second command.

10. A system, comprising:

a plurality of cloud pools, each cloud pool hosted by cloud hardware;

a plurality of cloud applications in each of the plurality of cloud pools;

a health monitoring application for the plurality of cloud applications in each of the plurality of cloud pools;

a plurality of global load balancers, each load balancer in communication with a subset of the plurality of cloud pools;

a listener application; and a remediation application;

wherein:

the listener application is configured to receive, from each health monitoring application, a health status of the plurality of cloud applications in the plurality of cloud pools;

the listener application is configured to receive a maintenance schedule for the plurality of cloud applications and/or the cloud hardware, the maintenance schedule comprising a plurality of maintenance events;

the listener application is configured to identify an impacted cloud application of the plurality of cloud applications and/or impacted cloud hardware that is scheduled for one of the plurality of maintenance events from the maintenance schedule;

the listener application is configured to map the impacted cloud hardware and/or the impacted cloud application to a global load balancer;

the remediation application is configured to send a first command to the mapped global load balancer to disable traffic to the impacted cloud hardware and/or the impacted cloud application;

the mapped global load balancer is configured to disable traffic to the impacted cloud hardware and/or the impacted cloud application;

the remediation application is configured to execute the maintenance events on the impacted cloud hardware and/or the impacted cloud application;

the remediation application is configured to send a second command to the global load balancer to re-enable traffic to the impacted cloud hardware and/or the impacted cloud application; and the mapped global load balancer is configured to enable traffic to the impacted cloud hardware and/or the impacted cloud application.

11. The system of claim 10, wherein each of the plurality of cloud pools comprises an instance of each cloud application.

12. The system of claim 10, wherein the listener application is configured to receive critical resource utilization and terminate signals from the plurality of cloud pools.

13. The system of claim 10, wherein the health monitoring application periodically polls the cloud hardware and/or the plurality of cloud applications for a health status.

14. The system of claim 10, wherein the maintenance events comprise patches.

15. The system of claim 10, wherein the remediation application is configured to determine that the impacted cloud hardware and/or the impacted cloud application can be taken out of scope before sending the first command, wherein the determination is based on a degradation in service resulting from the impacted cloud hardware and/or the impacted cloud application being taken out of scope.

16. The system of claim 10, wherein:

the listener application is configured to receive a prior status of the cloud hardware and/or the plurality of cloud applications; and the listener application is configured to determine that the impacted cloud hardware and/or the impacted cloud application were previously healthy before identifying the impacted cloud application and/or the impacted cloud hardware.

17. The system of claim 10, wherein the remediation application waits a period of time before sending the second command.

18. A non-transitory computer readable storage medium, including instructions stored thereon, which when read and executed by one or more computer processors, cause the one or more computer processors to perform steps comprising:

receiving, from a health monitoring application for a plurality of cloud pools, a health status of a plurality of cloud applications in the plurality of cloud pools, each cloud pool hosted by cloud hardware, wherein each of the plurality of cloud pools comprises an instance of each cloud application;

receiving a maintenance schedule for the plurality of cloud applications and/or the cloud hardware, the maintenance schedule comprising a plurality of maintenance events;

identifying an impacted cloud application of the plurality of cloud applications and/or impacted cloud hardware that is scheduled for one of the plurality of maintenance events from the maintenance schedule;

mapping the impacted cloud hardware and/or the impacted cloud application to a global load balancer;

sending a first command to the mapped global load balancer to disable traffic to the impacted cloud hardware and/or the impacted cloud application;

executing the maintenance events on the impacted cloud hardware and/or the impacted cloud application; and sending a second command to the mapped global load balancer to re-enable traffic to the impacted cloud hardware and/or the impacted cloud application.

19. The non-transitory computer readable storage medium of claim 18, further including instructions stored thereon, which when read and executed by the one or more computer processors, cause the one or more computer processors to perform steps comprising:

determining that the impacted cloud hardware and/or the impacted cloud application can be taken out of scope before sending the first command, wherein the determination is based on a degradation in service resulting from the impacted cloud hardware and/or the impacted cloud application being taken out of scope.

20. The non-transitory computer readable storage medium of claim 19, further including instructions stored thereon, which when read and executed by the one or more computer processors, cause the one or more computer processors to perform steps comprising:

retrieving a prior status of the cloud hardware and/or the plurality of cloud applications; and determining that the cloud hardware and/or the impacted cloud application were previously healthy before identifying the impacted cloud application and/or the impacted cloud hardware.

* * * * *